United States Patent [19]

Hanada

[11] Patent Number: 5,400,170

[45] Date of Patent: Mar. 21, 1995

[54] METHOD OF CONTROLLING SIZE OF LIGHT BEAM PULSES USED TO FORM RESPECTIVE PLURAL PIXELS ON A PRINT MEDIUM

[75] Inventor: Koji Hanada, Tokyo, Japan

[73] Assignee: Toyo Ink Manufacturing Co., Ltd., Tokyo, Japan

[21] Appl. No.: 75,021

[22] Filed: Jun. 11, 1993

Related U.S. Application Data

[63] Continuation of Ser. No. 782,966, Oct. 25, 1991, abandoned.

[30] Foreign Application Priority Data

Oct. 26, 1990 [JP] Japan ................................ 2-290213

[51] Int. Cl.⁶ ........................................... G02B 26/02
[52] U.S. Cl. .................................. 359/232; 359/227; 359/233

[58] Field of Search ................ 359/227, 232, 233, 894

[56] References Cited

U.S. PATENT DOCUMENTS 4,812,913 3/1989 Knop et al. .................... 359/227

*Primary Examiner*—William L. Sikes
*Assistant Examiner*—Hung Xuan Dang
*Attorney, Agent, or Firm*—Wenderoth, Lind & Ponack

[57] ABSTRACT

Plural successive light beam pulses are directed through a continuously adjustable aperture. An actuator is driven to change an aperture diameter of the continuously adjustable aperture for each of the plural successive light beam pulses directed therethrough. The aperture diameter is adjusted in this manner in accordance with a pixel diameter of each of respective plural pixels to be printed on a print medium by the plural successive light beam pulses.

9 Claims, 3 Drawing Sheets

METHOD OF CONTROLLING SIZE OF LIGHT BEAM PULSES USED TO FORM RESPECTIVE PLURAL PIXELS ON A PRINT MEDIUM

This application is a Continuation of now abandoned application, Ser. No. 07/782,966, filed Oct. 25, 1991, now abandoned

FIELD OF THE INVENTION

The present invention relates to a method of writing or outputting digital image data with a light beam. In particular, it relates to a method of changing the size of a light beam continuously at a high velocity while retaining its analogous form.

DESCRIPTION OF THE RELATED ART

In the fields of printing plates, laser beams and printers, there have been recently used a method for writing digital image data with a light beam and a device to which such a method is applied.

In the field of printing plates, a dot printing method has been conventionally known as a method of reproducing a half tone image (gradation expression), and gives an image closest to a natural tone expression of full color. Various techniques have been developed as means of forming dots. For example, there are available a method using a contact screen, a method using a dot generator, and the like.

As a method of reproducing or writing halftone image data with a light beam, used in a laser beam printer, etc., there have been proposed a number of methods such as an ordered dither method, a density pattern method, an error diffusion method, etc.

In the means of reproducing or writing digital image data with a light beam, used in printing plates and laser beam printers, in general, the size of the light beam is constant and is used as one element, and a matrix consisting of $n \times n$ elements as a group is used as a pixel. Therefore, one pixel can have $(n^2+1)$ density patterns, which is all that one pixel can represent. Since the light beam size is constant, the gradation expression has its own limit.

In order to increase intermediate tones in expression, it is required to increase the number of pixel elements. If, however, the number is increased, the size of the pixel increases due to the constant size of a light beam which constitutes a pixel element, and the fineness of the resultant image in expression is impaired.

The above problem on the fineness in expression can be overcome by decreasing the size of a light beam. However, with a decrease in the size of a light beam, the number of scanning lines increases. As a result, it is required to increase the position control accuracy, increase the amount of data which can be processed or increase the sensitivity of an object to be written. For this reason, when the above method of decreasing the size of a light beam is applied to commercial devices such as a light beam-applied laser beam printer, a full color copying machine, etc., the resultant devices are not practical.

Under the above circumstances, there has been proposed a method of changing the size of a light beam with an iris diaphragm or a liquid crystal diaphragm as is described in JP-A-61-113018. The problem with this method is that the control for changing the size of a light beam takes time. For example, when this method is applied to a laser beam printer or a full color copying machine, the writing rate is very low, and a device using this method has not yet been put to practical use.

SUMMARY OF THE INVENTION

It is an object for the present invention to provide a method of controlling the size of a light beam, which is suitable for a device for writing image data, character data, etc., with a light beam.

It is another object of the present invention to provide a method for controlling the size of a light beam continuously at a high velocity with retaining the light beam form analogously.

It is further another object of the present invention to provide a method for controlling the size of a light beam for forming a dot with the light beam per se.

It is still further another object of the present invention to provide a method for controlling the size of a light beam, in which a light beam which can form a dot can be outputted every dot.

Further, it is another object of the present invention to provide a method for controlling the size of a light beam, which permits excellent gradation expression with a full color copying machine, etc.

According to the present invention, there is provided a method for controlling a size of a light beam, which comprises forming an aperture, of which the size can be changed continuously and analogously, with at least two aperture forming members including at least one movable aperture forming member which can be actuated at a high velocity and finely with an actuation means; and irradiating the aperture with a light beam thereby changing the size of the light beam continuously and analogously.

BRIEF DESCRIPTION THE DRAWINGS

DETAILED DESCRIPTION OF THE INVENTION

Figure 1:
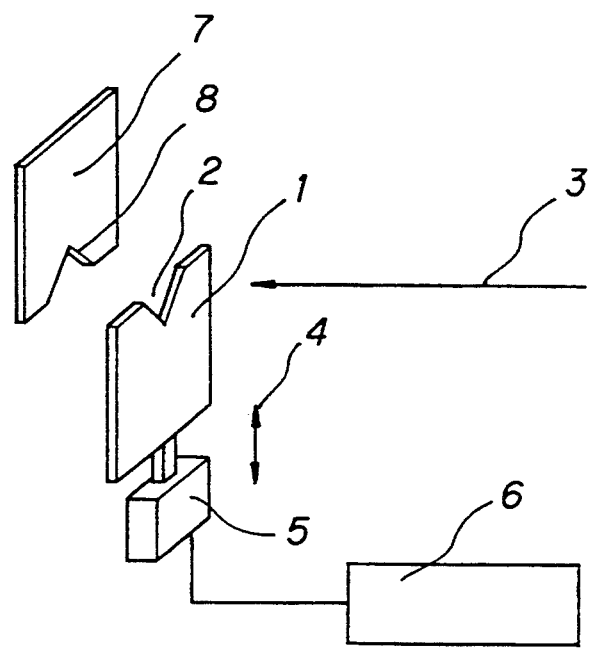
FIGS. 1, 3 and 6 are schematic views showing methods of controlling the size of a light beam according to the present invention.

When an aperture is formed with a fixed aperture-forming member and a movable aperture-forming member, the size of the aperture is changed analogously in the direction of the movable aperture-forming member with the apex of the fixed aperture-forming member as a base point. That is, dots of which the sizes are decreasing or increasing are continuously formed with one point as a start point. When dots, i.e., pixels are arranged in the same manner as in printing, it is preferred to align pixels to form a straight line. For example, when a dot alignment is formed on an electrophotographic photoreceptor of a copying machine, the pulse interval of a light beam is adjusted according to a deviation in the center of the groove form. That is, in the case of a dot having a small size, the pulse interval is increased. In the case of a dot having a large size, the pulse interval is decreased. In the case of a writing in a monocolor, an image is not adversely affected even if the centers of pixels are aligned to form a straight line. In the case of writing in full color, centers of the pixels are aligned accurately to form a straight line, whereby an image of an intermediate tone is fully reproduced. When centers of the pixels are not aligned to form a straight line, moire, etc., are liable to occur, and this tendency is particularly outstanding in the case of writing in full color.

In the method in which a plurality of movable aperture-forming members are moved, the form of irradiation with a light beam is controlled with the form of aperture elements of a plurality of the aperture-forming members, and the center of the form of the aperture can be fixed. It is therefore not necessary to correct a difference (distance) between the above center of the form and the center of the pixel.

When a laser is used as a light source, the center of an irradiation intensity distribution of a light beam and the center of the controlling form of the aperture are brought into agreement. As a result, a stable irradiation intensity distribution can be obtained in any size of the light beam.

When there is a possibility that the controlled light beam is extremely distorted before it reaches an object to be irradiated, the light beam controlling is useless. It is therefore preferable to use sufficiently parallel light beams, and preferred is a light beam from a point light source which is easily optically controlled. As a light source, preferred is a laser which emits nearly non-chromatic light and scarcely causes a chromatic aberration problem.

When the movable aperture-forming member under actuation and the pulse of a laser beam are synchronized, an alignment of dots having any size can be obtained. When the form of the aperture-forming member is changed, an alignment of dots having any form can be obtained.

That is, the movable aperture-forming member is moved up to a predetermined position, and a pulse of a light beam is provided, whereby a pixel having a predetermined size can be made.

When pixels are continuously made by moving the movable aperture-forming member, it is important to match the time required for determining the position of the aperture with the time required for positioning an object to be irradiated with the pixel-forming beam. That is, when a pulse alignment of a light beam is provided at constant time intervals, the time required for determining the position of the aperture is required to be sufficiently smaller than a pulse interval of the light beam or the time required for determining the position of the object.

Further, a light beam having any size can be obtained as follow. A light beam is converged with a lens, and an aperture to be actuated is provided near the point where the light is converged. In the present invention, the form and size of a light beam may be changed.

In the above method, the diameter of the light beam can be decreased. In particular, when the diameter of the light beam is controlled at a high velocity, a load on an actuation system which moves the movable slit-forming member can be reduced.

Further, the linearity of an original light beam may be recovered by directing a converged light beam through a lens.

The present invention is further detailed hereinafter by reference to drawings.

FIG. 1 is a schematic view showing one embodiment of the present invention which uses an aperture consisting of an aperture element 8 of a fixed aperture-forming member 7 and an aperture element 2 of a movable aperture-forming member 1 of which the position is shifted according to a displacement of an actuation system 5.

The actuation system 5 is means which can actuate the movable aperture-forming member at a high velocity and finely. The actuation system is selected from a multilayer piezoelectric actuator in which piezoelectric ceramic layers are laminated and a voice coil, etc. With the piezoelectric multilayer actuator, there can be provided an electric potential in proportion to a voltage applied.

Figure 2:
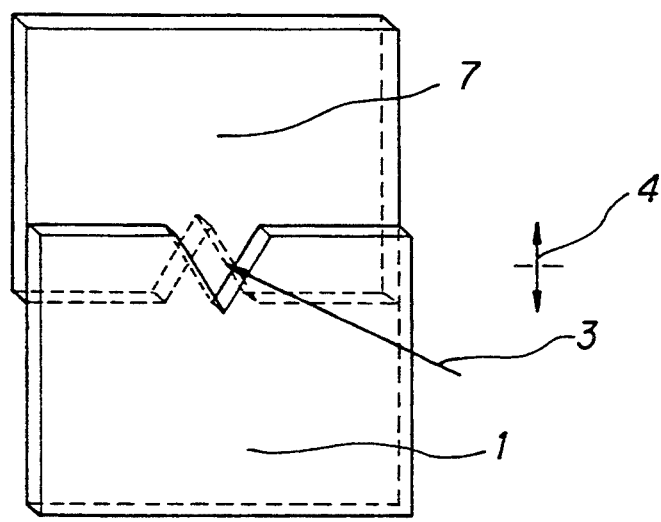
FIGS. 2, 4 and 5 are schematic views of aperture forms used in methods of controlling the size of a light beam according to the present invention.

FIG. 2 is a schematic view showing the relationship among an aperture element of the fixed aperture-forming member, an aperture element of the movable aperture-forming member and a light beam. The diameter of a light beam 3 can be controlled when the light beam 3 is directed through the aperture formed of an aperture element 8 of the fixed aperture-forming member 7 and an aperture element 2 of the movable aperture-forming member. Of course, the form of the aperture can be analogously changed as shown in a displacement 4.

Figure 3:
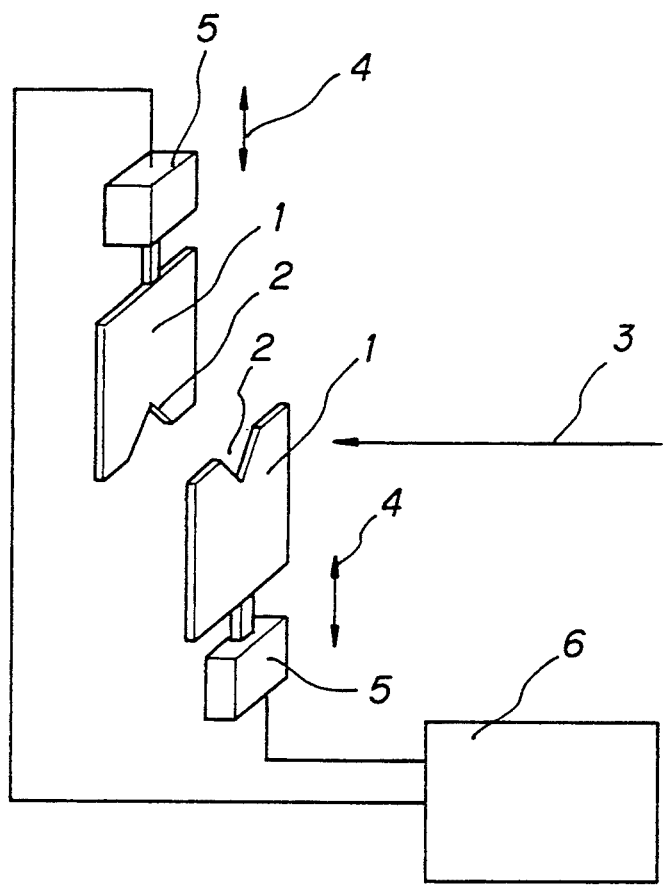

FIG. 3 shows an embodiment in which a movable aperture-forming member 1 is positioned downward and another movable aperture-forming member 1 is positioned upward. As explained in the embodiment shown in FIG. 1, a control portion 6 provides actuation systems of these with voltages required for movement of these aperture-forming members 1.

Further, when a more complicated form of the aperture is required, the aperture may be formed by means of three or more aperture-forming members.

Figure 4:
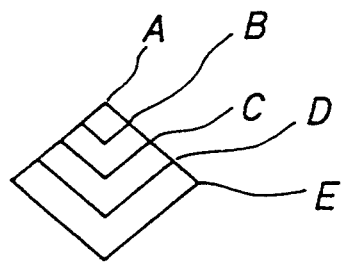
Figure 5:
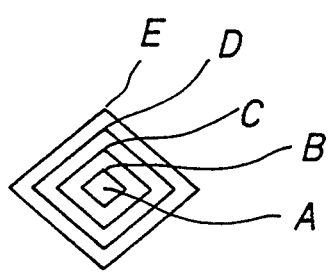

FIGS. 4 and 5 each show a change in the beam size when the beam is controlled in the above methods.

When a fixed aperture-forming member is used as shown in FIG. 1, the size of the beam is continuously changed in the order of A, B, C and D with a control base point A as a start point as shown in FIG. 4. However, for example, a difference in the distance between the control base point A and the center of a quadrilateral figure E poses a problem when centers of the pixels are aligned in the same manner as in a dot printing. It is therefore necessary to correct the position of an object to be irradiated so that the center of the pixel is brought into agreement with the center of the aperture form.

When a plurality of movable aperture-forming members are used as shown in FIG. 3, the control base point A and the center of each of quadrilateral figures B, C, D and E can be brought into agreement as shown in FIG. 5, and it is therefore unnecessary to the position correction shown in FIG. 1.

Figure 6:
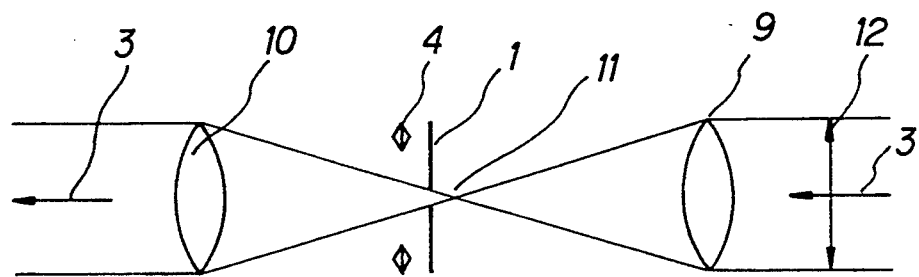

FIG. 6 shows a schematic view showing a method in which a light beam 3 having a diameter 12 is converged with a lens 9 and a movable aperture-forming member 1 is provided near a focus portion 11 to give a displacement 4.

In the above method, the displacement 4 can be made smaller than the diameter 12 of the light beam, and the time required of the actuation system for determining the position can be decreased to a great extent. This method is therefore suitable for controlling a light beam at a high velocity.

Further, the light beam of which the size has been controlled as above may be restored to its original state with a lens 10.

In the above methods, the size of the aperture can be continuously determined while the form of the light beam is retained. Further, when the aperture size is in a predetermined position, a pulse of a light beam is provided, whereby an alignment of pixels having a predetermined size can be simply obtained.

Figure 7:
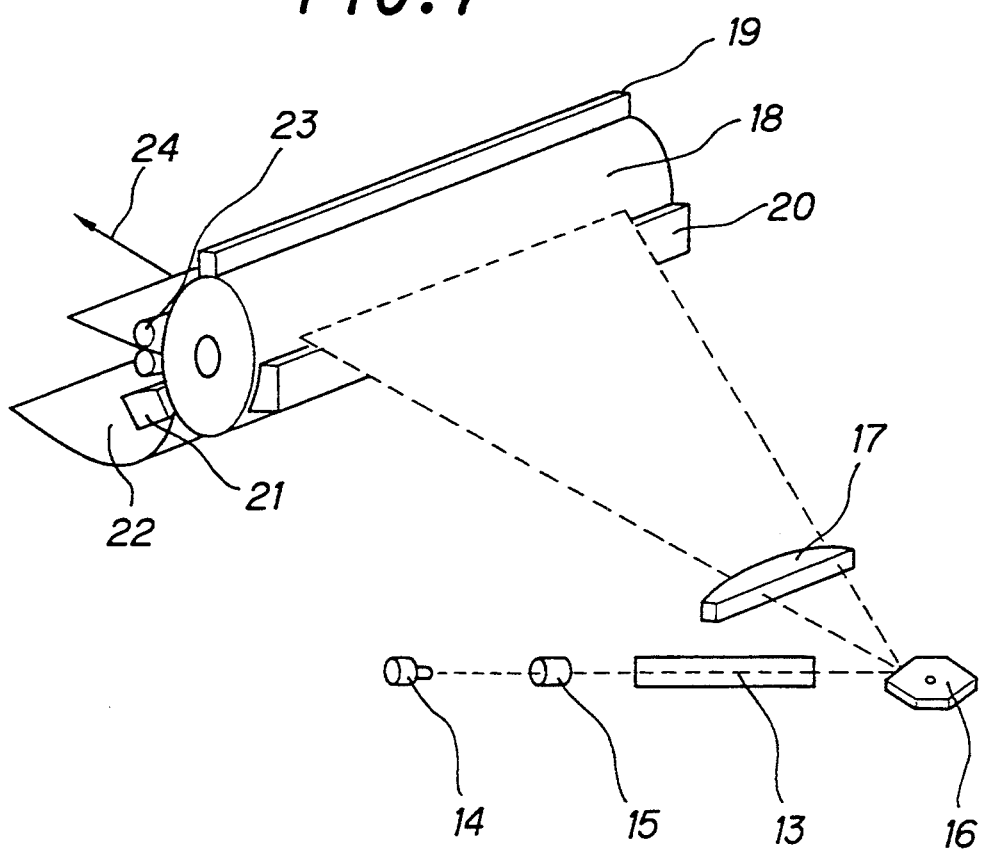
FIG. 7 is a perspective view of one embodiment of a method of controlling the size of a light beam according to the present invention.

FIG. 7 is a schematic view showing one embodiment in which a light beam control portion according to the present invention is applied to a laser beam printer. In FIG. 7, numeral 14 is a light source such as a semiconductor laser, a gas laser, etc. Numeral 15 is a collimeter. Numeral 16 is a rotary polygon mirror. Numeral 17 is an fθ lens. Numeral 18 is a photosensitive drum. Numeral 19 is a charging device. Numeral 20 is a developer. Numeral 21 is a transfer device. Numeral 22 is a paper sheet. Numeral 23 is a fixing device. Numeral 24 indicates a direction in which the paper sheet moves.

The optical system and the operation principle of the above printer is the same as those of conventional laser beam printers. However, data to be provided to the laser beam source is entirely different.

It is preferred to generate pulse only when the center of a pixel is in agreement with a position of irradiation with a laser beam which is set depending upon rotary polygon mirror 16 and the photosensitive drum 18. In the embodiments shown in FIGS. 5 and 6, the area of the aperture of the aperture-forming member(s) 1 is determined depending upon the density of an original image, and the actuation system(s) 5 is provided with a voltage in proportion to said area.

The time required for moving the movable aperture-forming member 1 is preferably smaller than the time required for determining a position on the photosensitive drum 18 which is an object to be irradiated. The pulse diameter 12 of the laser beam is naturally larger than the size of the aperture, and the size of the aperture of the movable aperture-forming member 1 is naturally dependent on a maximum pixel element diameter.

As described above, according to the present invention, the size of a light beam can be continuously changed at a high velocity, and dots can be reproduced similarly to a conventional dot print method used in the field of a printing plate.

The method of the present invention can be widely applied to printing apparatus used for image processing with a light beam such as a proof printing machine, a printing plate, a laser beam printer, etc., and light beam-applied processing machines.

What is claimed is:

1. A method of controlling the diameter of plural successive light beam pulses used to form respective plural pixels on a print medium, said method comprising:

directing the plural successive light beam pulses through a continuously adjustable aperture; and, driving an actuator to change an aperture diameter of said continuously adjustable aperture for each of said plural successive light beam pulses directed therethrough in accordance with a pixel diameter of each of said respective plural pixels to be printed on the print medium.

2. The method according to claim 1, wherein said adjustable aperture includes at least a fixed aperture-forming member and a movable aperture-forming member, and wherein said driving step includes continuously activating the movable aperture-forming member finely at a high velocity.

3. The method according to claim 1, wherein said adjustable aperture includes at least two movable aperture-forming members, and wherein said driving step includes continuously actuating both of said two movable aperture-forming members finely at a high velocity.

4. The method according to claim 1, wherein the light beam pulses are laser beam pulses.

5. The method according to claim 1, wherein the adjustable aperture is position-controlled in synchronism with the light beam pulses.

6. The method according to claim 1, wherein the adjustable aperture is located near a convergence point of the light beam pulses where the light beam pulses are converged with a lens.

7. The method according to claim 1, wherein the actuator is a laminated piezoelectric actuator.

8. The method according to claim 1, wherein the actuator is a voice coil.

9. A method of controlling the diameter of plural successive light beam pulses used to form respective plural pixels on a print medium, said method comprising:

directing the plural successive light beam pulses through a continuously adjustable aperture formed by a plurality of continuously adjustable aperture members; and, driving respective actuators associated with said plurality of continuously adjustable aperture members to change an aperture diameter of said continuously adjustable aperture for each of said plural successive light beam pulses directed therethrough in accordance with a pixel diameter of each of said respective plural pixels to be printed on the print medium.

* * * * *